United States Patent
Ferman

(10) Patent No.: US 9,539,946 B2
(45) Date of Patent: Jan. 10, 2017

(54) VEHICLE MIRROR ASSEMBLY

(76) Inventor: Michael Ferman, Peakhurst (AU)

(*) Notice: Subject to any disclaimer, the term of this patent is extended or adjusted under 35 U.S.C. 154(b) by 53 days.

(21) Appl. No.: 14/343,736

(22) PCT Filed: Sep. 11, 2012

(86) PCT No.: PCT/AU2012/001082
§ 371 (c)(1),
(2), (4) Date: Apr. 8, 2014

(87) PCT Pub. No.: WO2013/036987
PCT Pub. Date: Mar. 21, 2013

(65) Prior Publication Data
US 2014/0218816 A1 Aug. 7, 2014

(30) Foreign Application Priority Data
Sep. 12, 2011 (AU) ............... 2011903694

(51) Int. Cl.
*G02B 7/182* (2006.01)
*B60R 1/06* (2006.01)
*B60R 1/078* (2006.01)

(52) U.S. Cl.
CPC ............. *B60R 1/0605* (2013.01); *B60R 1/078* (2013.01)

(58) Field of Classification Search
CPC ............... B60R 1/06; B60R 1/04; B60R 1/12; B60R 1/0605; B60R 11/04; B60R 1/00; B60R 1/006; B60R 1/078; B60R 2001/1253; B60R 1/02; B60R 1/07; B60R 1/076; B60R 1/082; B60R 1/1207; B60R 2001/1215; B60R 2011/0026; B60R 2300/8046; G02B 5/0808; G02B 7/182; G02B 1/105; G02B 5/08; G02B 5/10; G02B 19/0042; G02B 1/04; G02B 19/0019; G02B 5/0866; G02B 7/183; G02B 1/10; G02B 1/14; G02B 27/0006; G02B 5/09; G02B 17/0605; G02B 19/0023; G02B 23/2476

USPC ........ 359/248, 466, 838, 871; 362/516–518; 296/1.11, 180.1–180.5; 701/36, 49; 340/468, 475; 348/148

See application file for complete search history.

(56) References Cited

U.S. PATENT DOCUMENTS

| | | | |
|---|---|---|---|
| 5,031,871 A | 7/1991 | Ohta et al. | |
| 5,355,255 A * | 10/1994 | Assinder | 359/871 |
| 5,615,054 A * | 3/1997 | Lang | B60R 1/0605 |
| | | | 359/841 |
| 6,325,519 B1 | 12/2001 | Lang | |
| 2003/0007261 A1* | 1/2003 | Hutzel | B60R 1/12 |
| | | | 359/838 |

OTHER PUBLICATIONS

Corresponding International Search Report dated Nov. 27, 2012.

* cited by examiner

*Primary Examiner* — Pascal M Bui Pho
*Assistant Examiner* — Sharrief Broome
(74) *Attorney, Agent, or Firm* — The Belles Group, P.C.

(57) ABSTRACT

A vehicle mirror assembly has a mirror retention plate having two parallel free edges and a replaceable mirror plate having a first surface to which the mirror is attached and a second surface opposite said first surface. The second surface has two parallel edges which includes projections on one of said edges able to retain one of said edges of the retention plate. On the second edge of said second surface of the mirror plate is a releasable locking mechanisms engageable with the other of said free edges of the retention plate. This allows the mirror plate to be simply snapped into position and released by triggering the release mechanism.

10 Claims, 19 Drawing Sheets

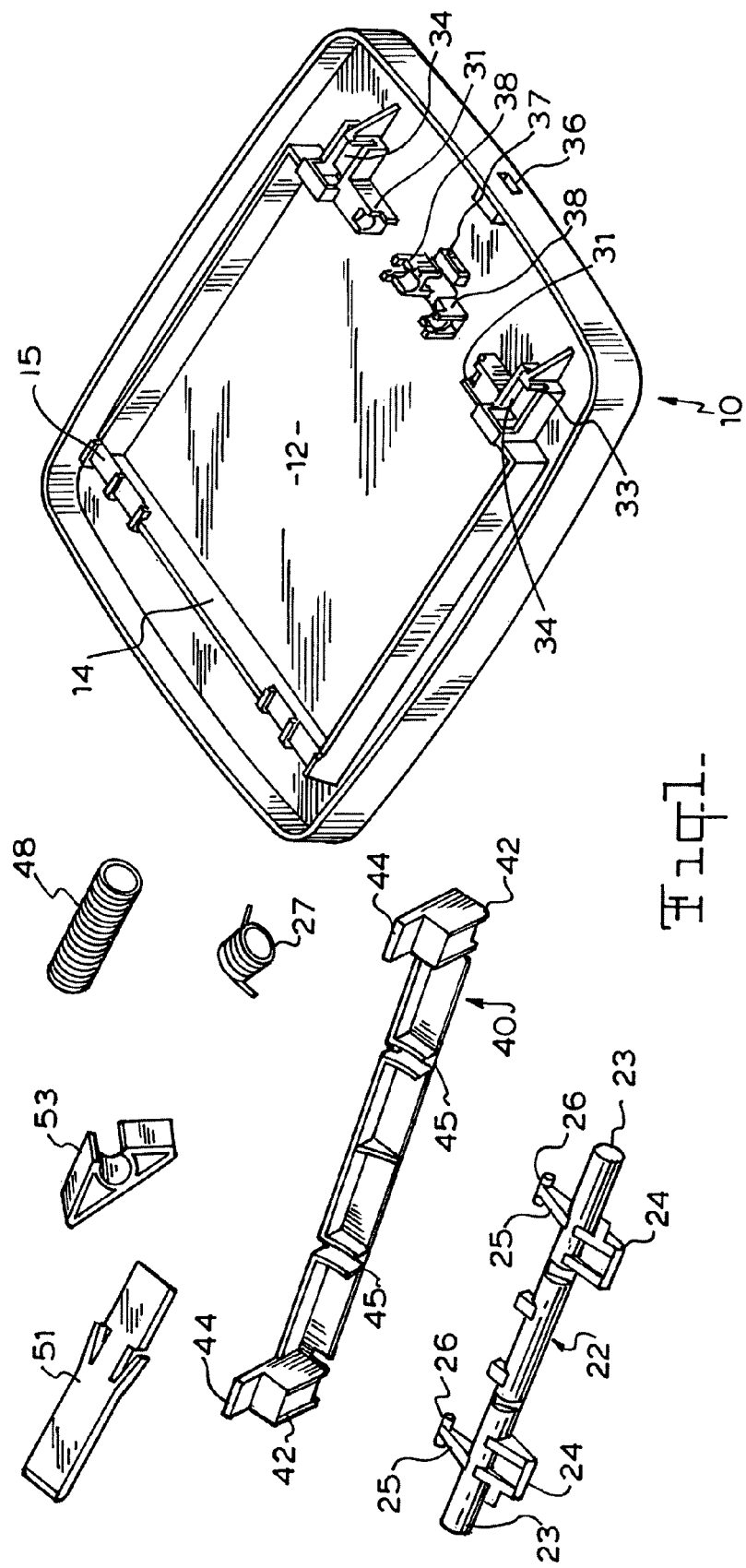

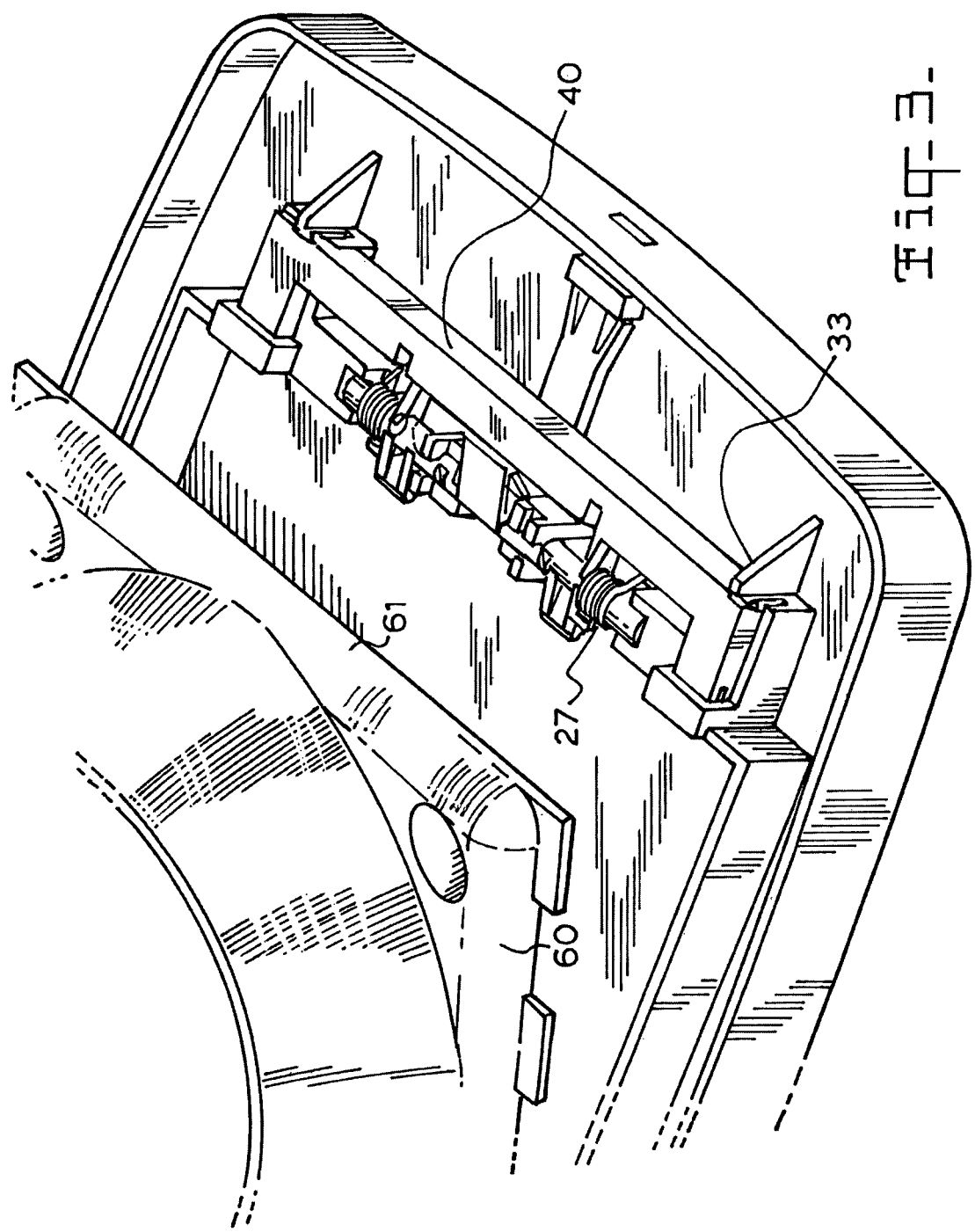

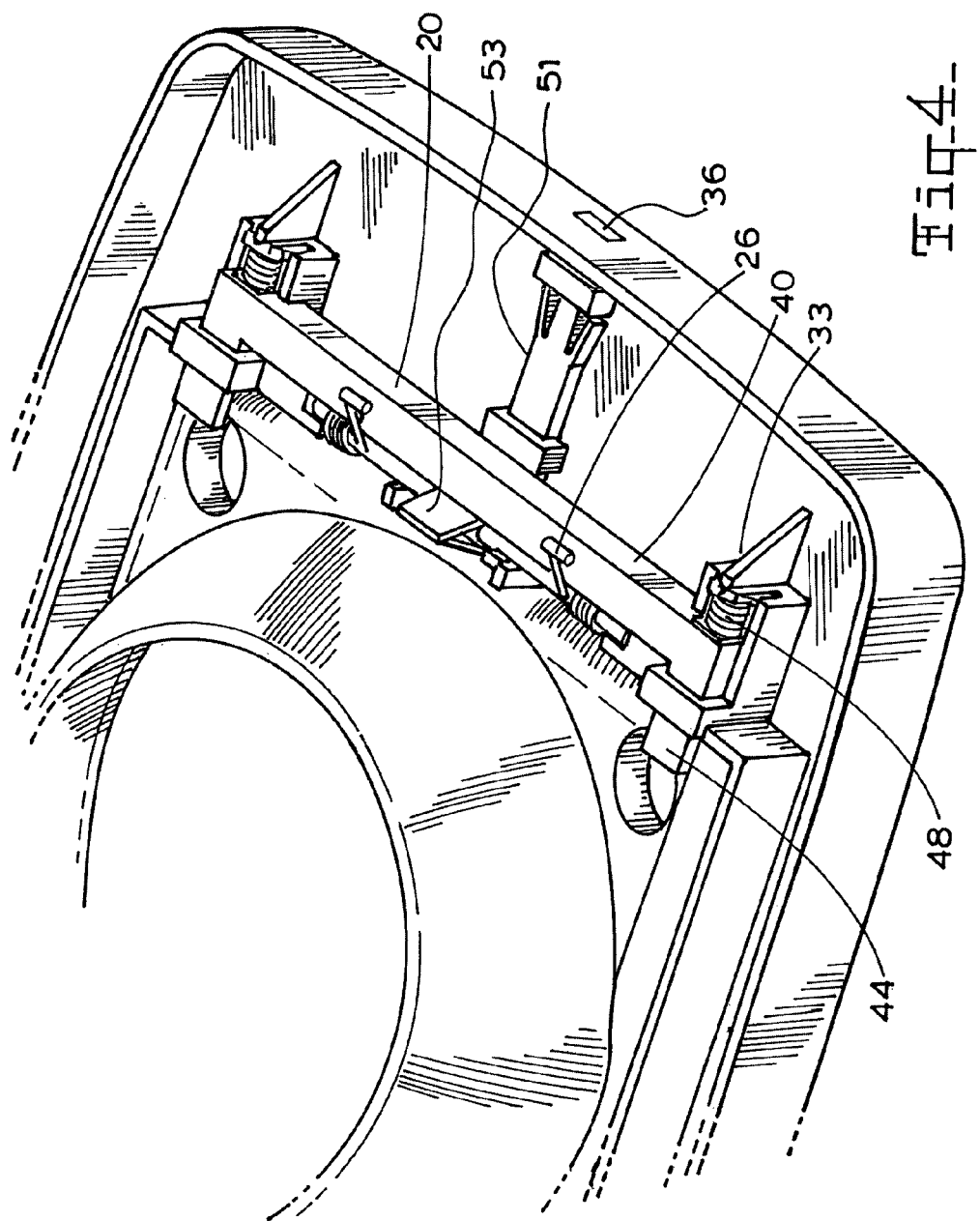

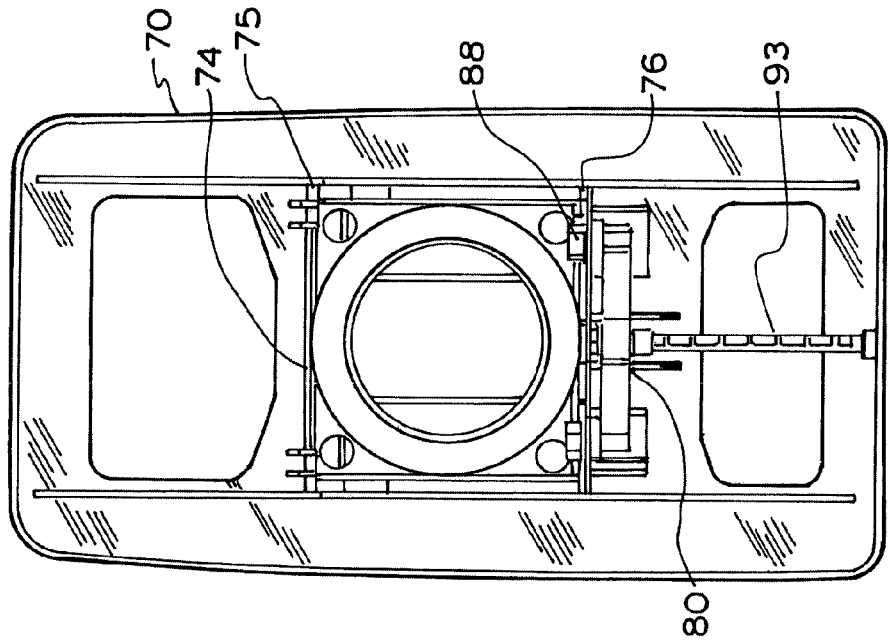
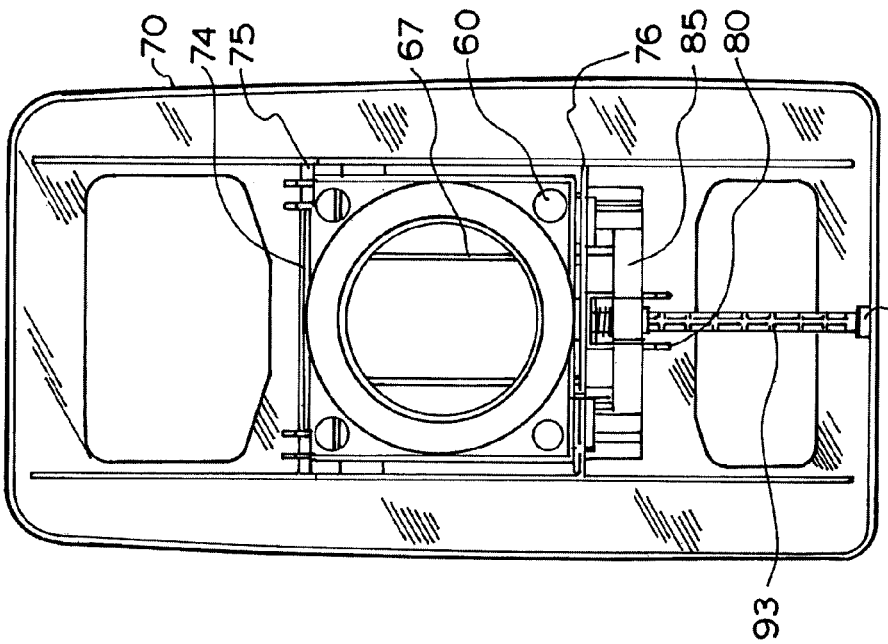

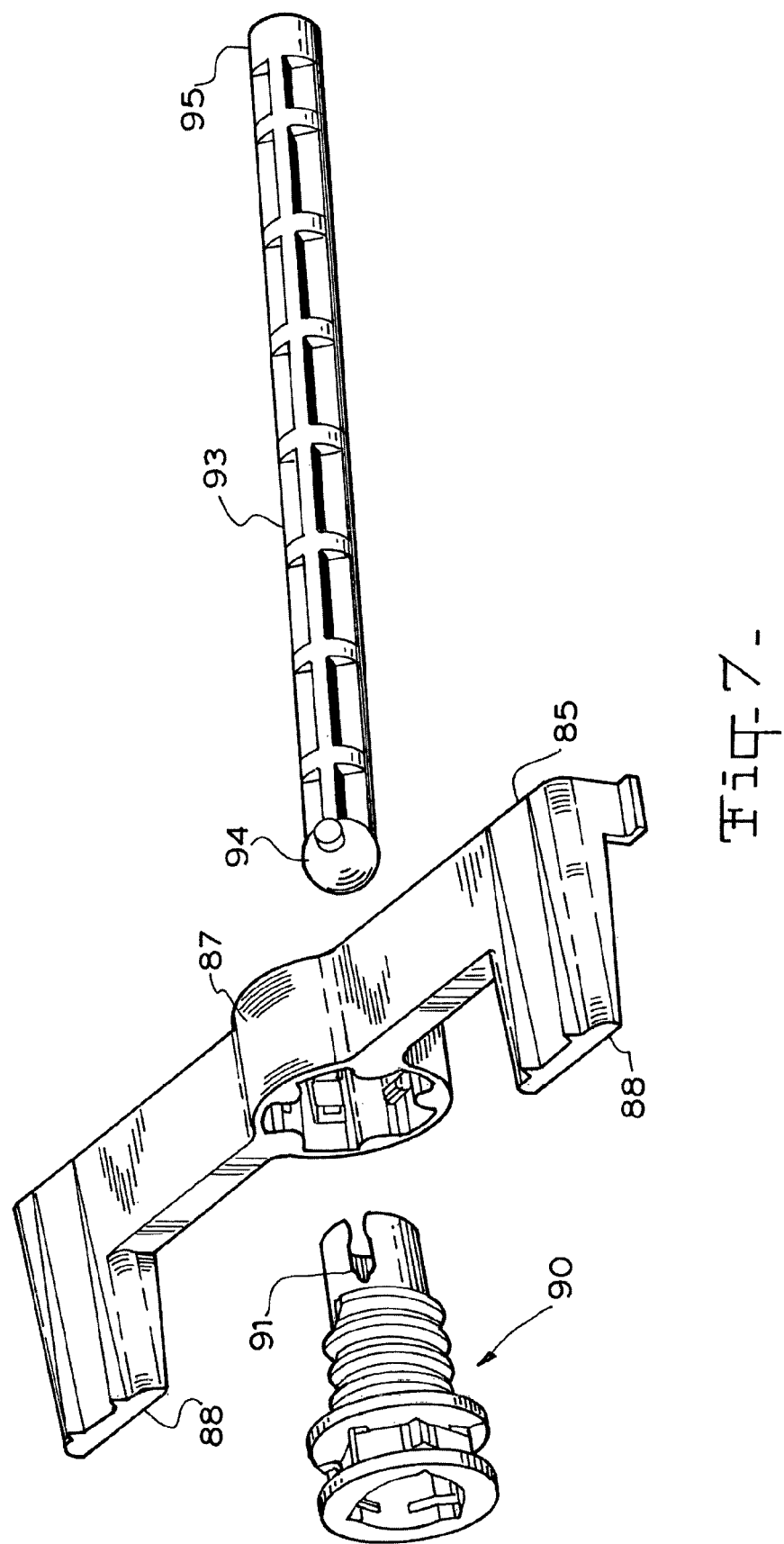

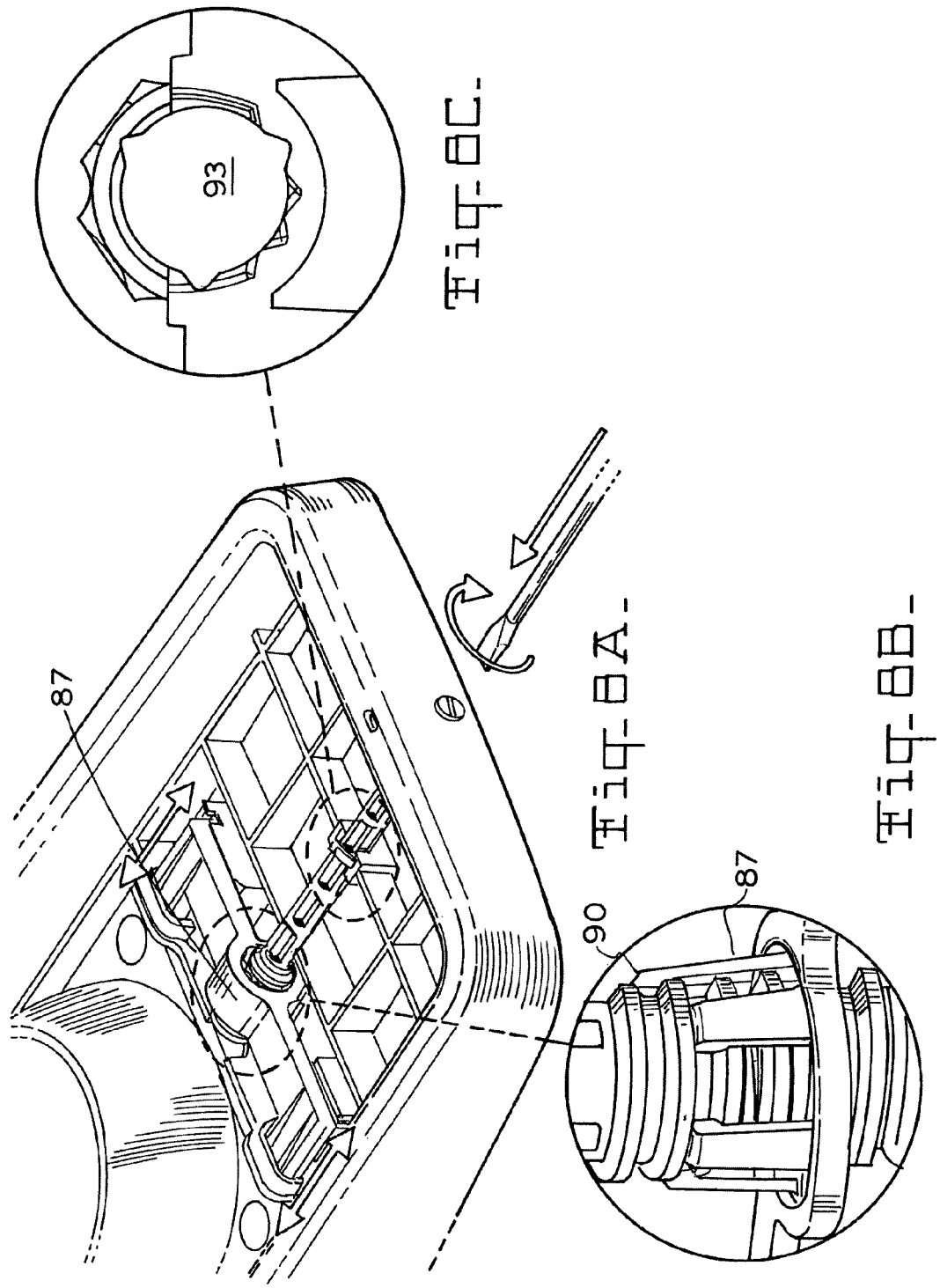

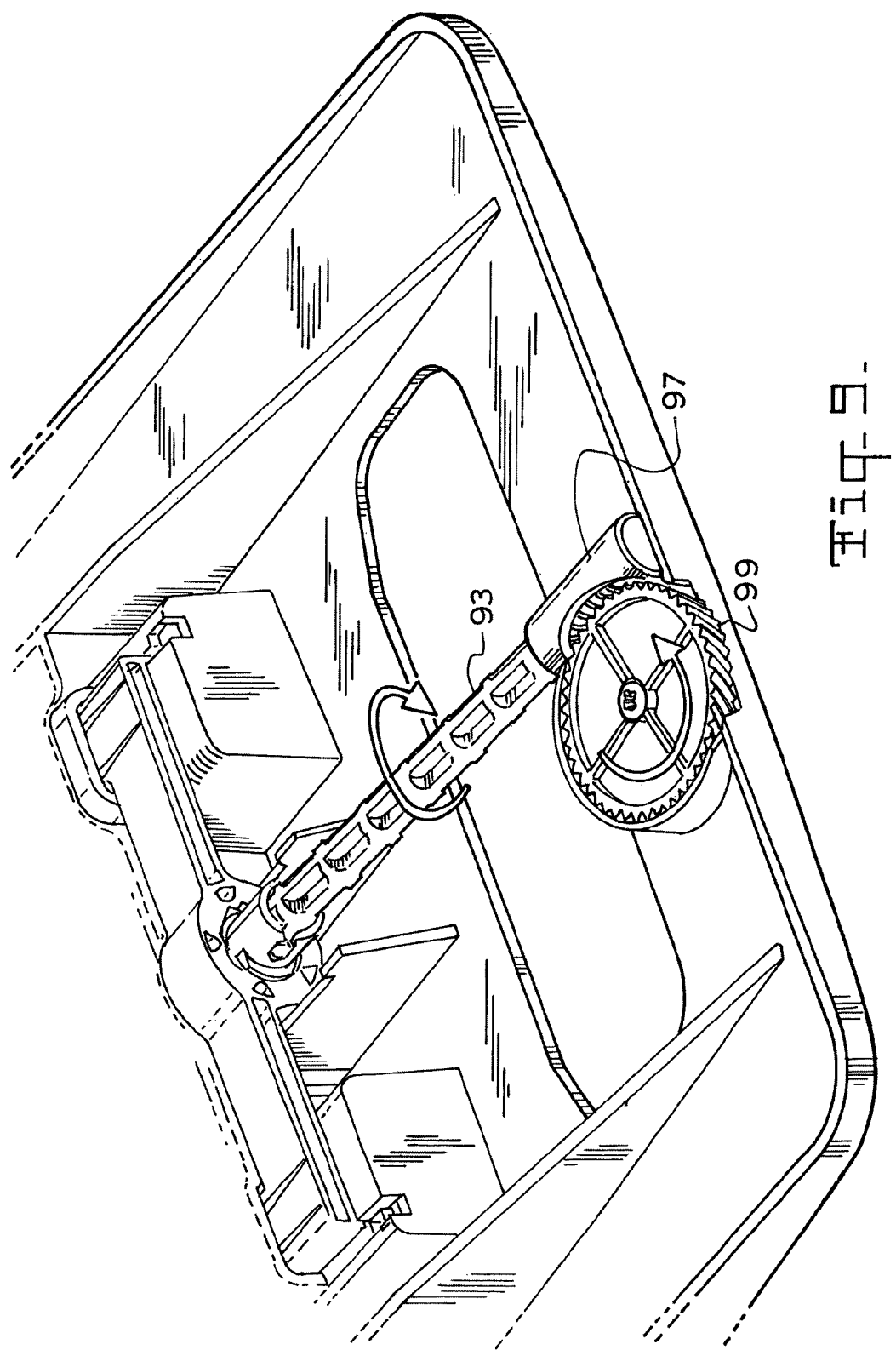

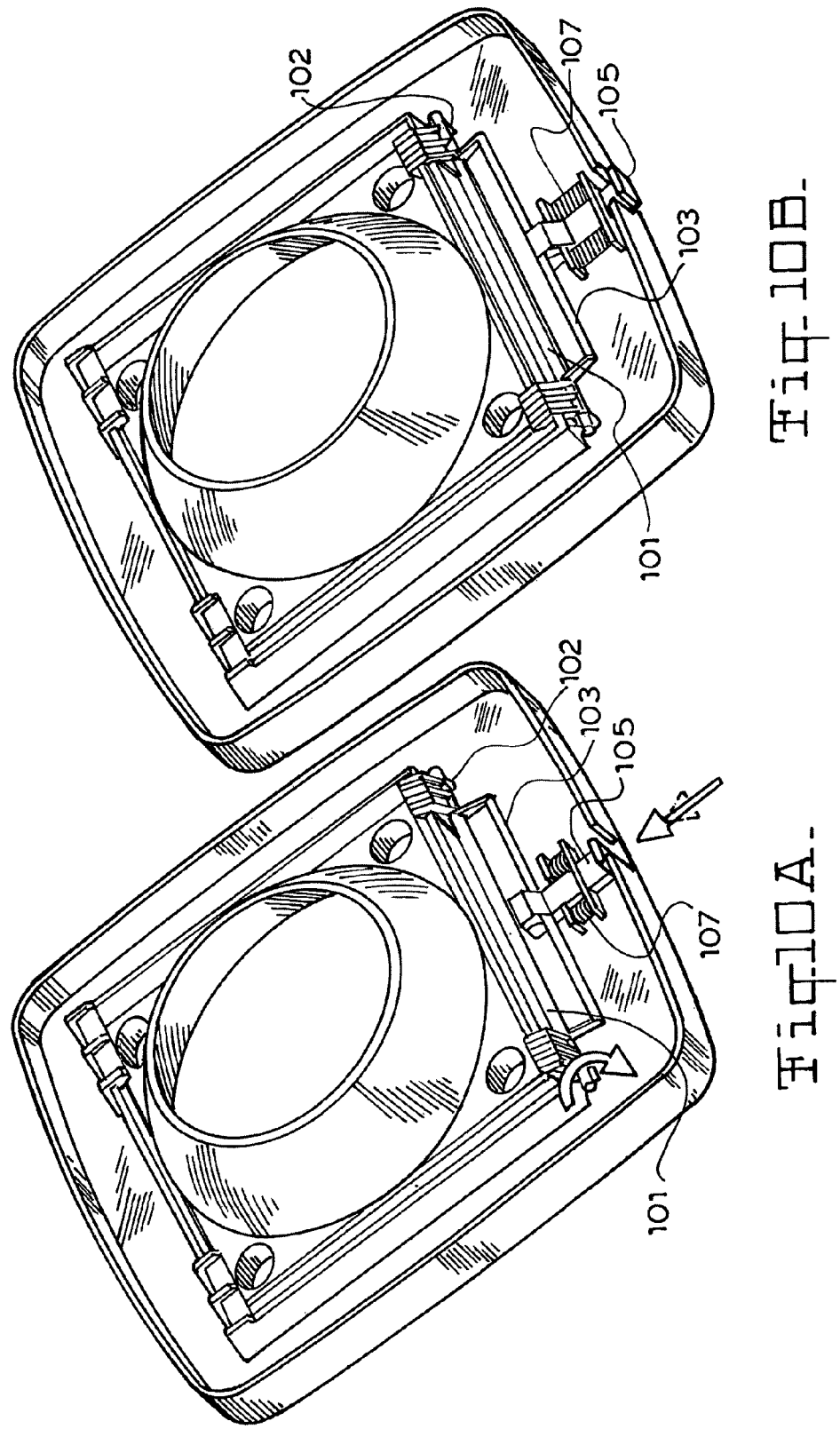

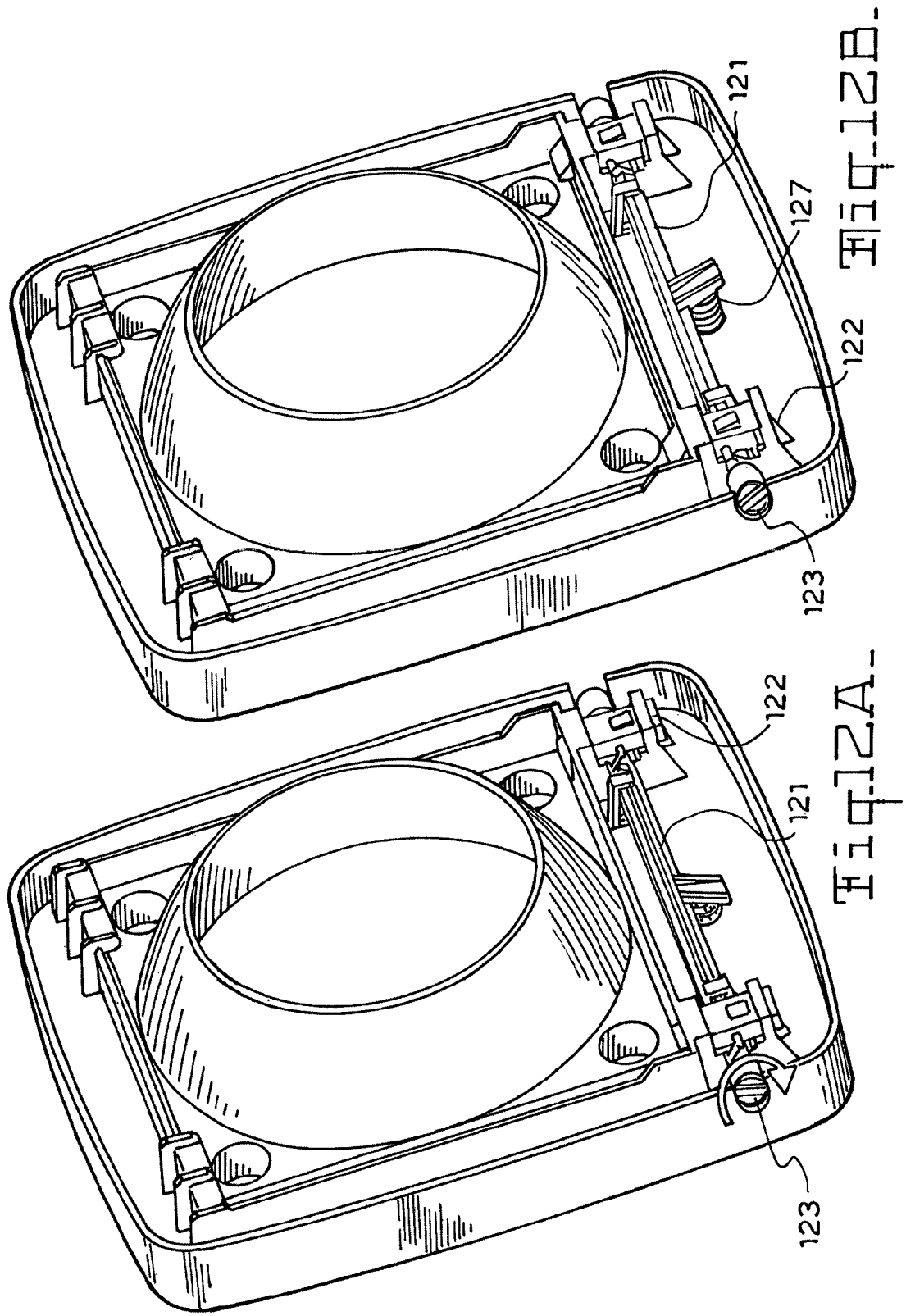

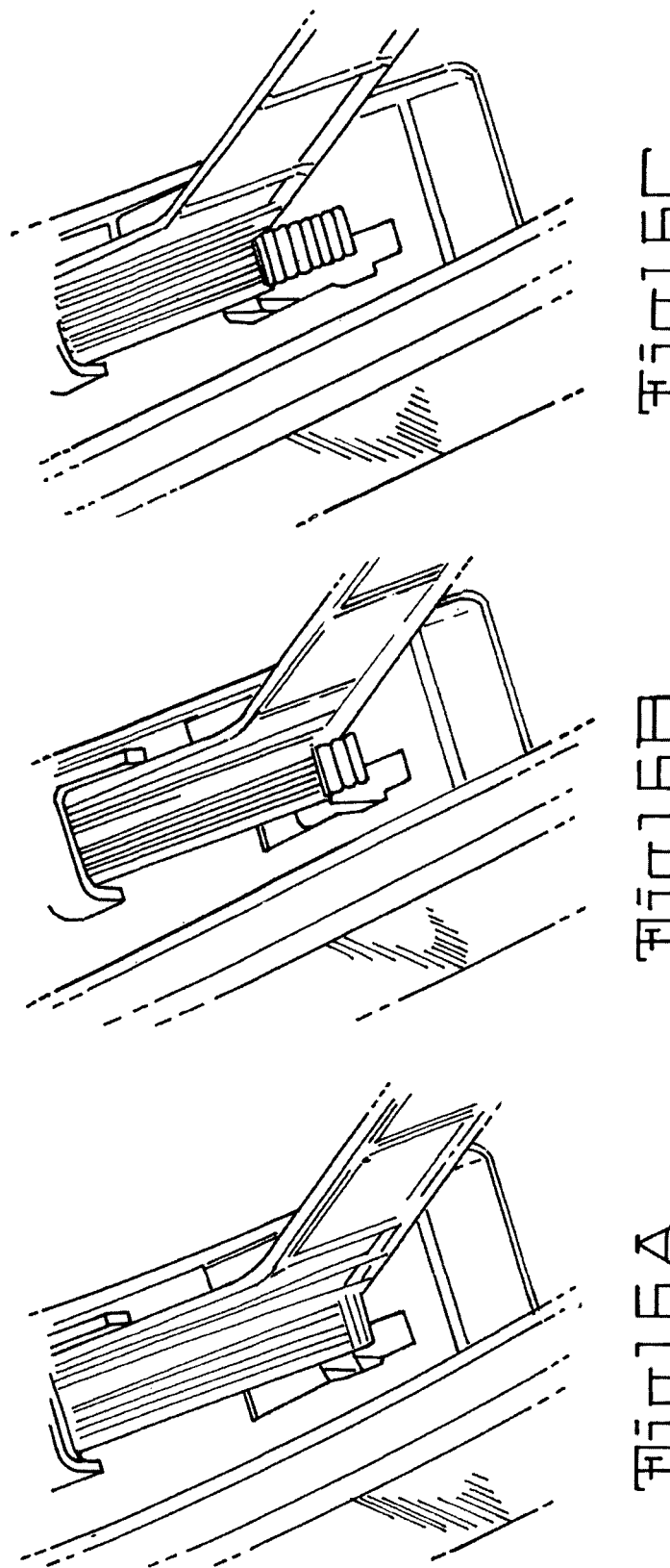

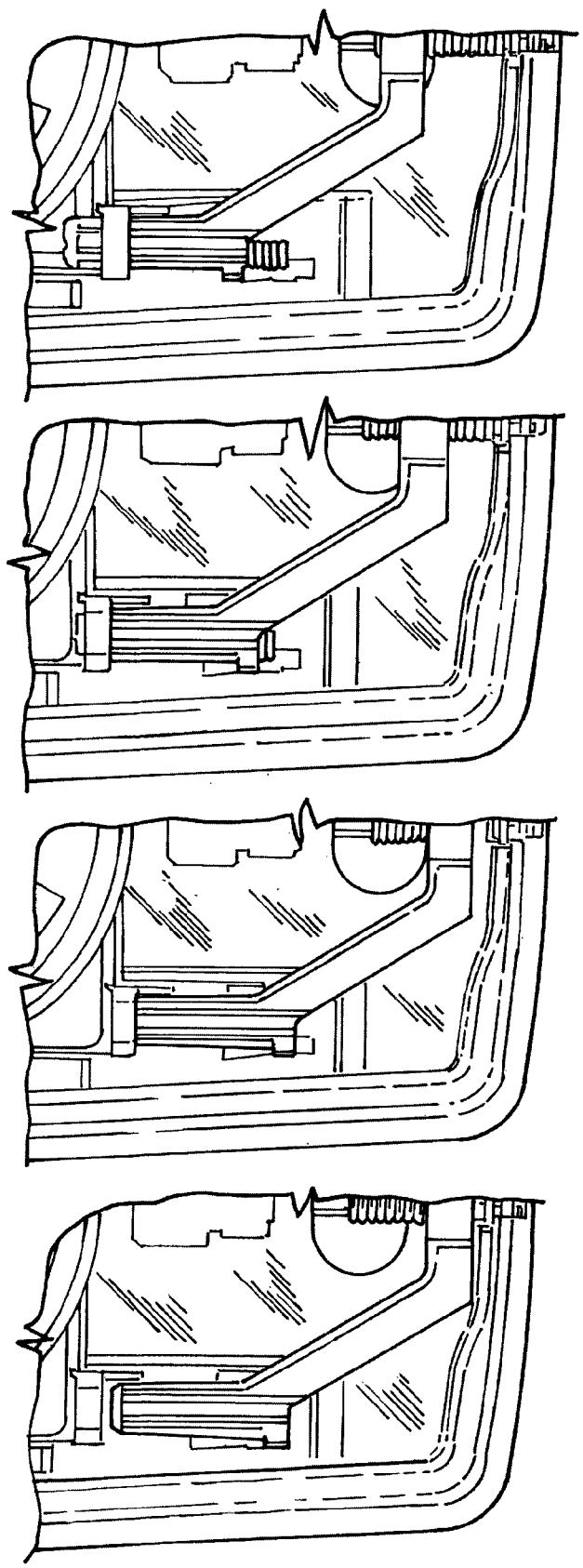

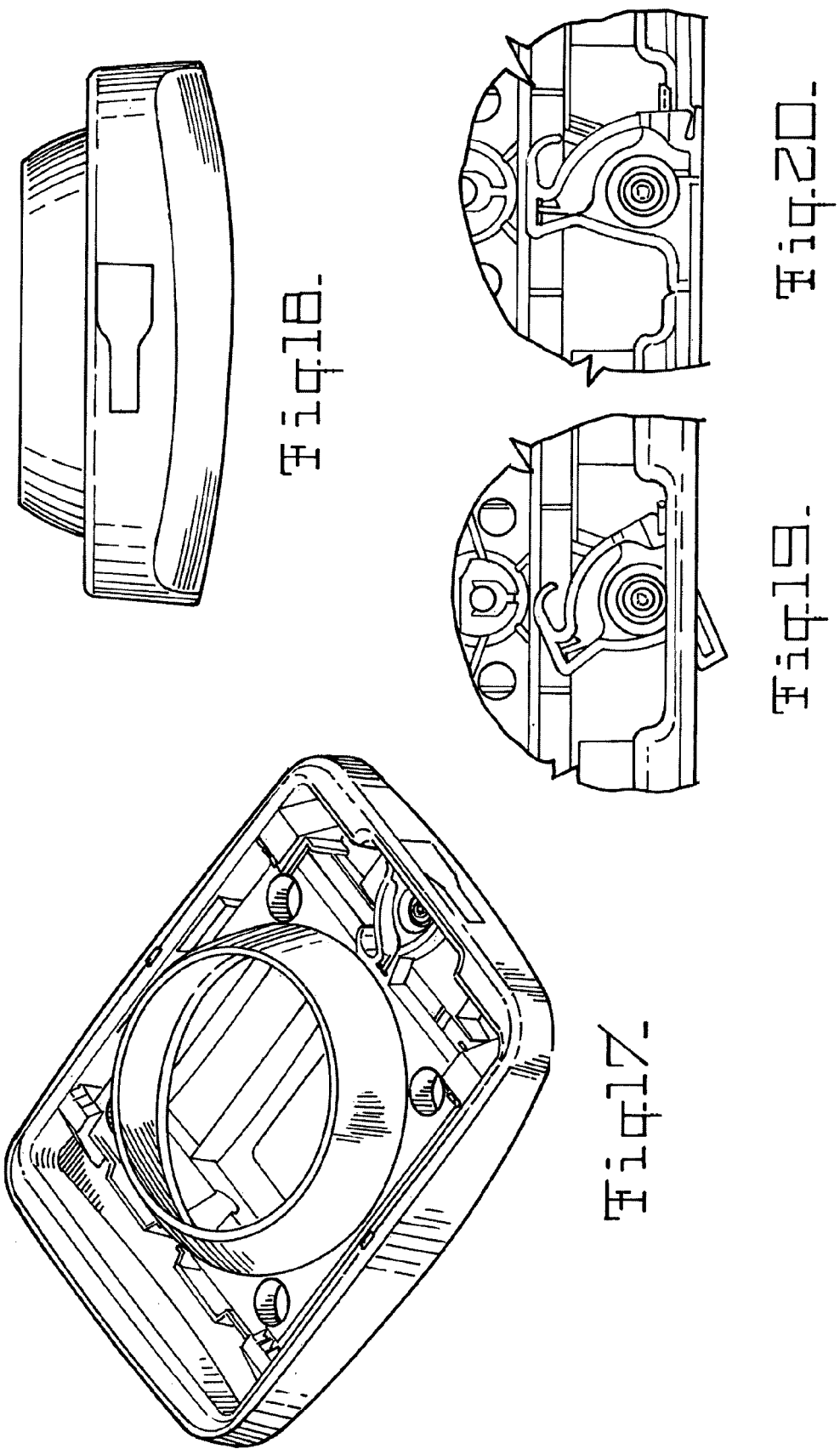

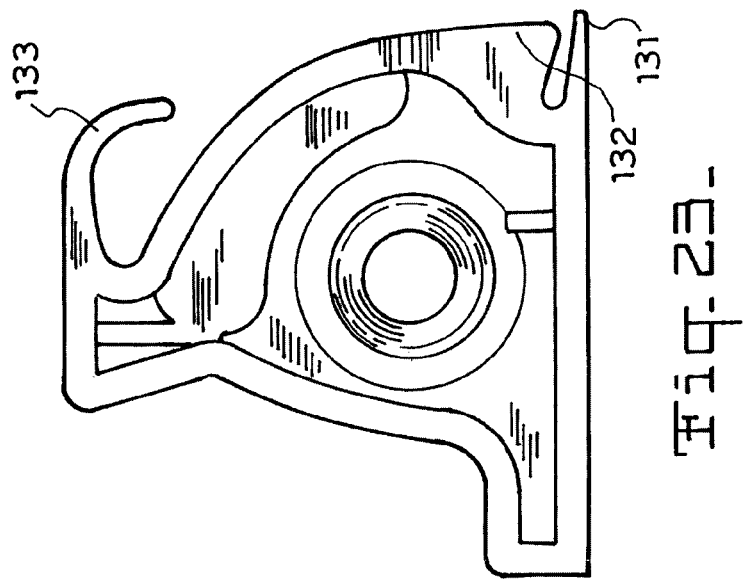
Fig. 23.
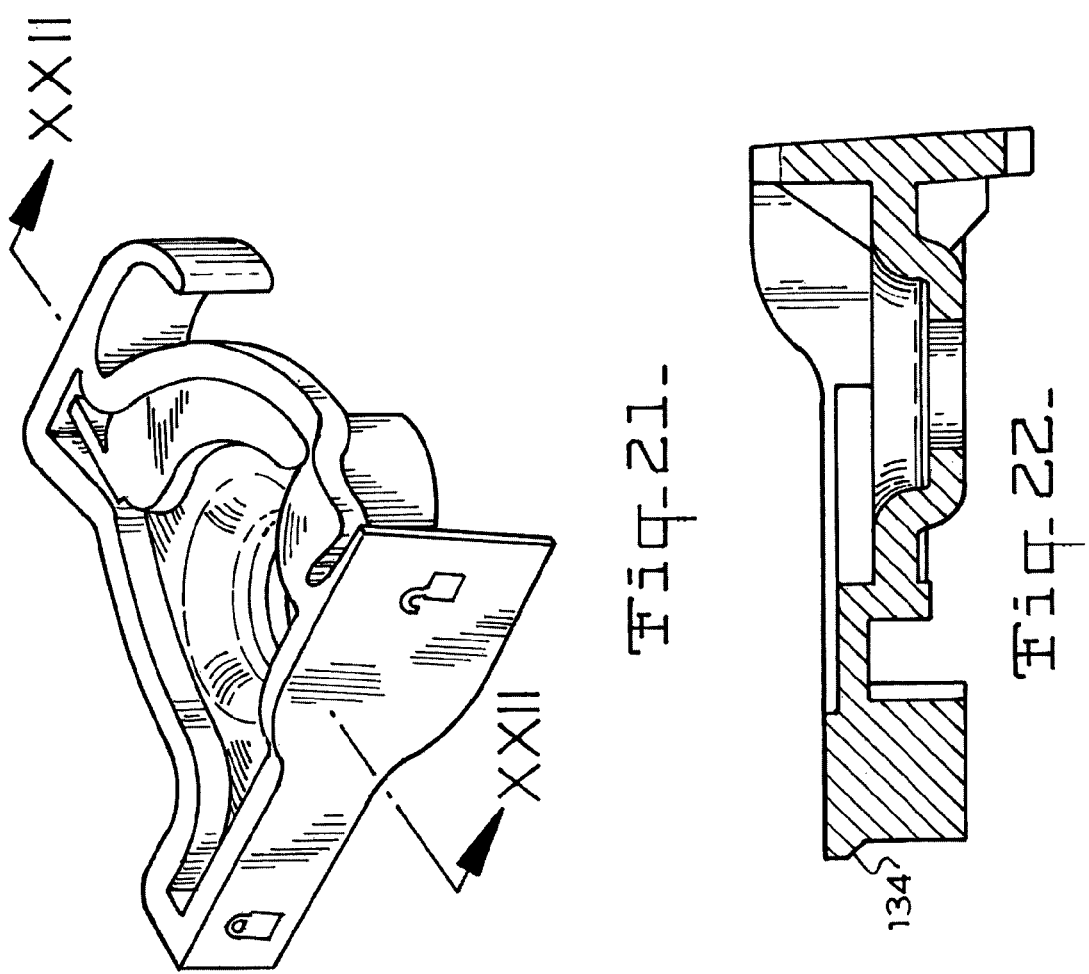
Fig. 21.
Fig. 22.

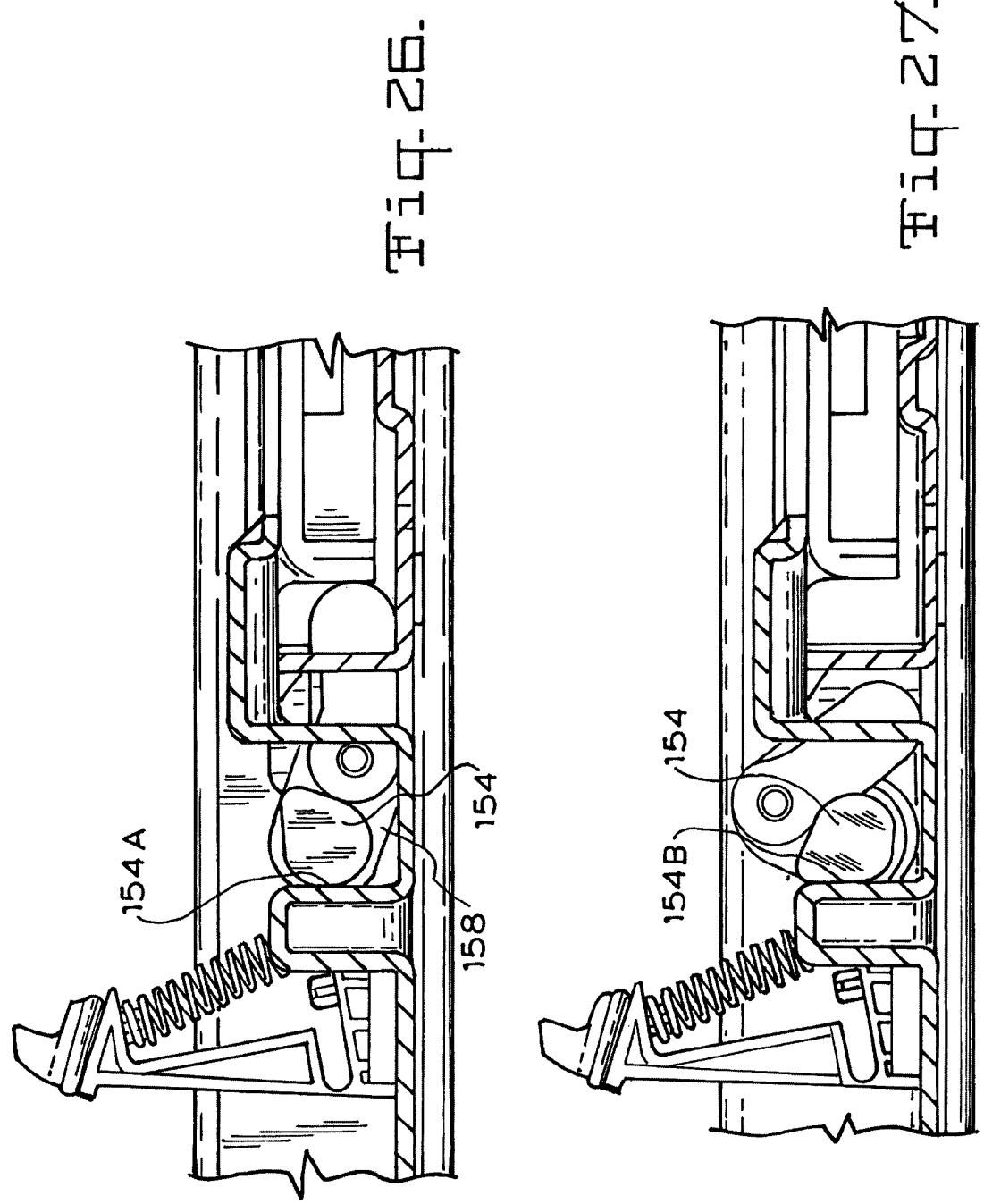

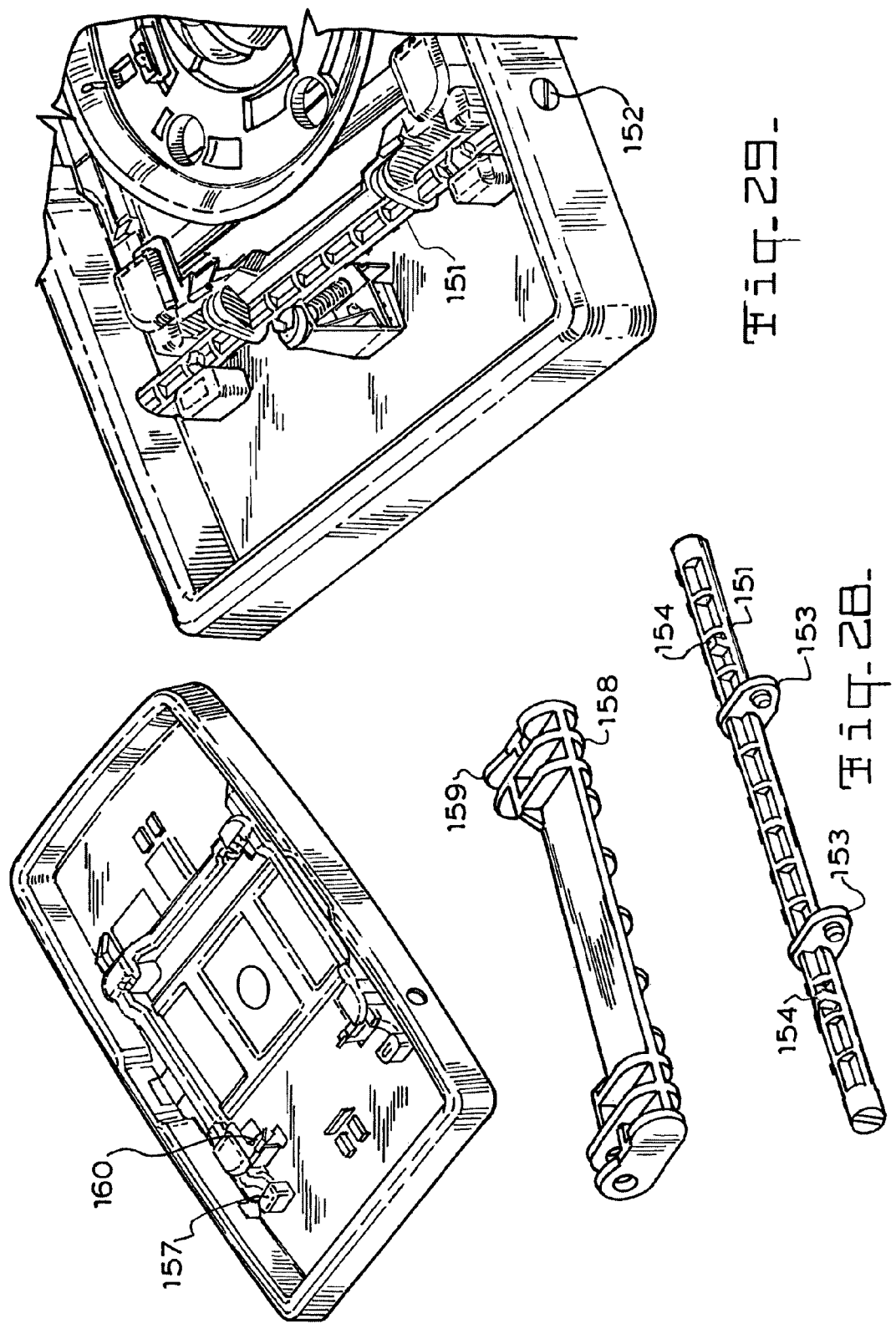

VEHICLE MIRROR ASSEMBLY

PRIORITY

Priority is claimed as a national stage application, under 35 U.S.C. §371, to international application No. PCT/AU2012/001082, filed Sep. 11, 2012, which claims priority to Australian application 2011903694, filed Sep. 12, 2011. The disclosures of the aforementioned priority applications are incorporated herein by reference in their entirety.

This invention relates to improvements in external vehicle rear vision mirrors especially of the type used on trucks. In particular it relates to an easily replaceable mirror plate

BACKGROUND TO THE INVENTION

U.S. Pat. No. 5,615,054 discloses a vehicle mirror in which the mirror is attached to a mirror plate that is in turn attached by a sliding engagement with a mirror retaining plate in the mirror housing. This arrangement allows for replacement of the mirror plate if the mirror is broken or damaged. Complementary projections are provided on two parallel sides of the mirror plate and the retaining plate so that the mirror plate can be slid into a retention position.

Alternative for mirror plate constructions that also use a sliding engagement are disclosed in U.S. Pat. Nos. 6,325,519, 6,328,451, and 6,375,333.

These arrangements provide no means to lock the mirror plate to the retaining plate. It is an object of this invention to provide a more satisfactory means of securely fastening the mirror to the mirror assembly and also providing an easy release mechanism.

BRIEF DESCRIPTION OF THE INVENTION

To this end the present invention provides a vehicle mirror assembly having a mirror retention plate having two parallel free edges, a mirror plate having a first surface to which the mirror is attached and a second surface opposite said first surface having two parallel edges which includes projections on one of said edges able to retain one of said edges of the retention plate and which further includes on the second edge of said second surface of the mirror plate a releasable locking mechanism engagable with the other of said free edges of the retention plate.

This arrangement allows the mirror plate to engage the first edge of the retention plate and then be pushed to engage the second edge. The releasable locking mechanism preferably provides retention projections which can be moved into and out of engagement with the free edge of the retention plate. Preferably the releasable locking mechanism is actuated by actuation means accessible in the side or end wall of the mirror plate.

Preferably the releasable mechanism is rotary so that insertion of the mirror plate releases a latch that holds the edge of the retention plate. Rotation of the mechanism retracts the latch and allows the mirror to be removed from the retention plate. Preferably the releasable locking mechanism is actuated by rotating a shaft with a screw driver wherein the end of the shaft is accessible from the side or end wall of the mirror plate.

DETAILED DESCRIPTION OF THE INVENTION

A preferred embodiment will now be illustrated with reference to the drawings in which:

FIG. 1 illustrates an exploded view of the components of a first embodiment of the mirror plate of this invention;

FIG. 3 illustrates the mirror locking mechanism of the first embodiment before actuation;

FIG. 4 illustrates the mirror locking mechanism of the first embodiment after actuation;

FIG. 5 illustrates the unlocked configuration of a second embodiment of the mirror plate of this invention;

FIG. 6 illustrates the locked configuration of a second embodiment of the mirror plate of this invention;

FIG. 7 is an exploded view of the components of the locking mechanism shown in FIGS. 5 and 6;

FIG. 8 illustrates details of the over tightening and anti rotation features of the embodiment of FIG. 7;

FIG. 9 illustrates an alternative actuator for the mechanism shown in FIGS. 5 to 8;

Figure 2A:
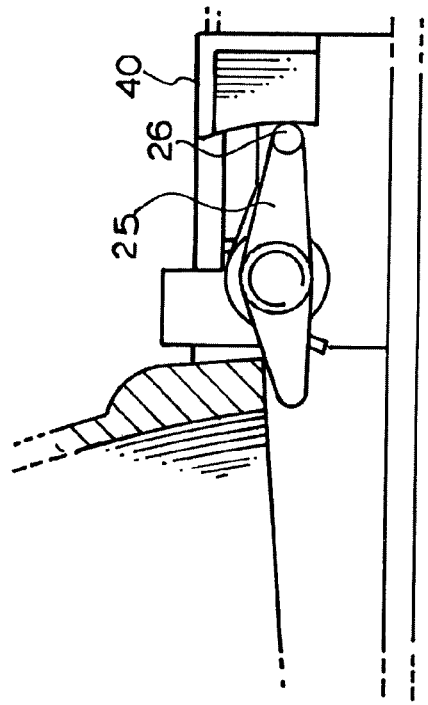
FIG. 2 is illustrate the 4 stages of snapping the second edge of the mirror plate onto the retention plate of FIG. 1.
Figure 2B:
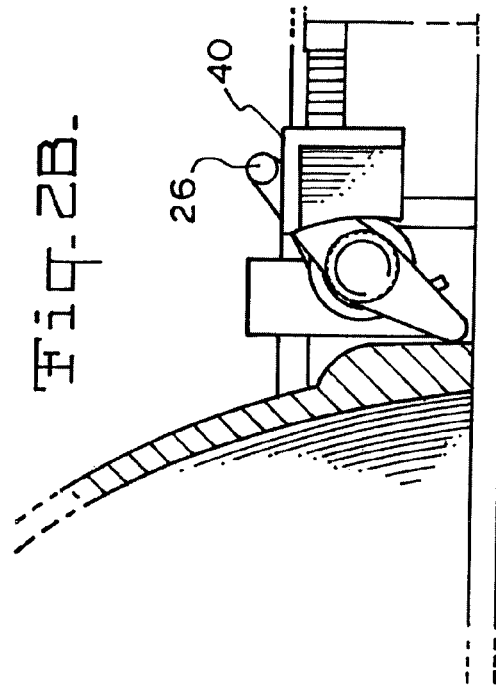
Figure 2C:
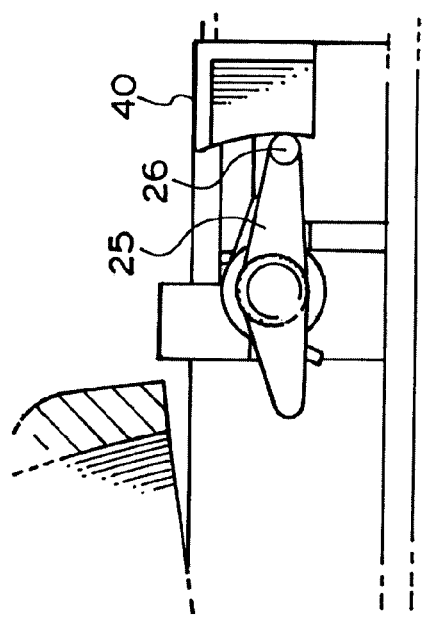
Figure 2D:
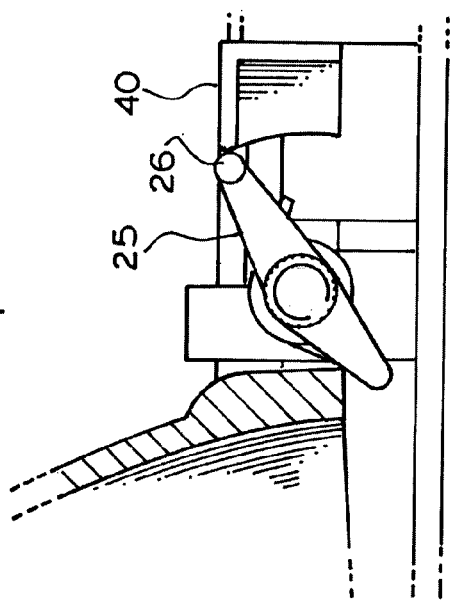
Figure 11A:
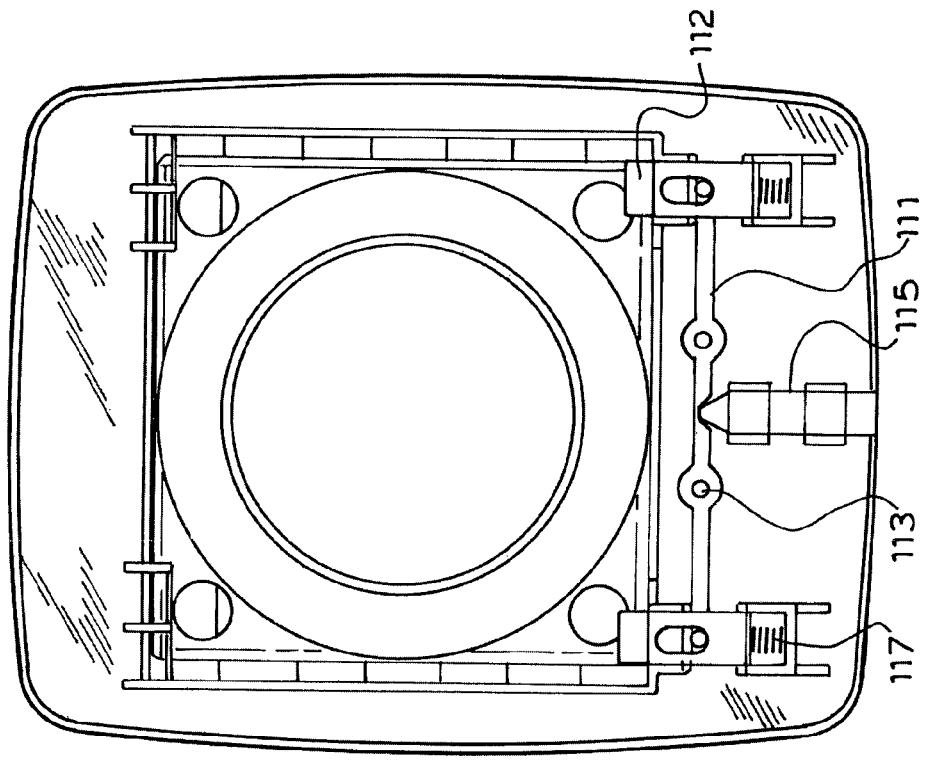
Figure 11B:
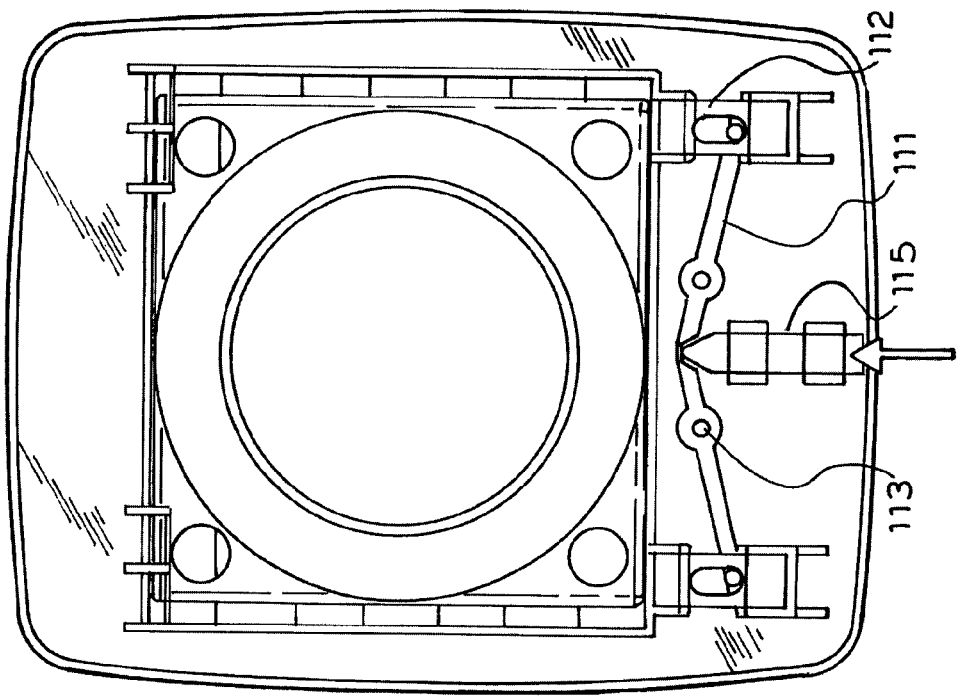
Figure 14:
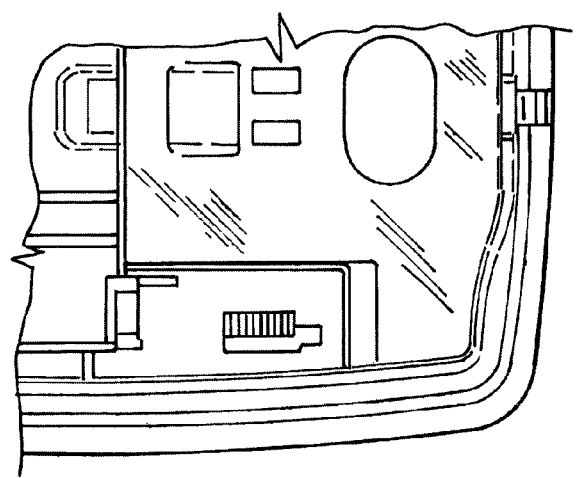
Figure 15:
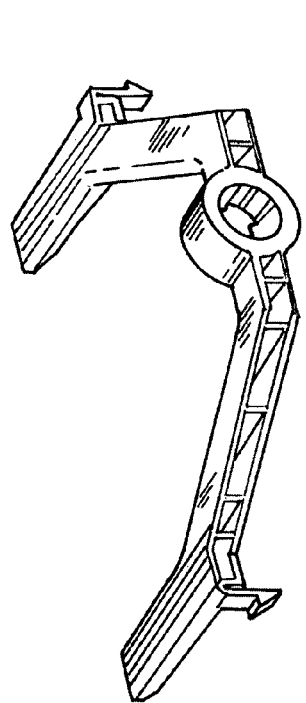
Figure 13:
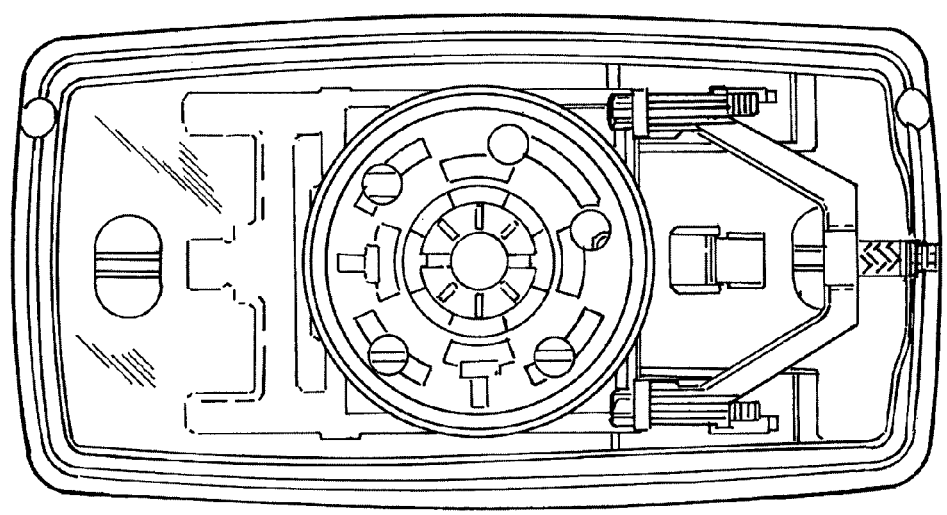

FIG. 10 illustrates a third embodiment of the invention;
FIG. 11 illustrates a fourth embodiment of the invention;
FIG. 12 illustrates a fifth embodiment of the invention;
FIGS. 13 to 16 illustrate a sixth embodiment of the invention;
FIGS. 17 to 23 illustrate a seventh embodiment of the invention;
FIGS. 24 to 29 illustrate an eighth embodiment of the invention.

The mirror assembly of FIGS. 1 to 4 consists of a minor plate 10 having a rear surface 12 which incorporates the attachment mechanism. The ledges or hooks 15 on one parallel rib 14 are adapted to engage one free edge of the retention plate 60 of the minor motor 61. This retention plate is usually of the kind described in U.S. Pat. No. 5,615,054 or U.S. Pat. Nos. 6,325,519, 6,328,451 and 6,375,333.

The latching mechanism 20 is spaced from rib 14 by a distance corresponding to the distance between the two edges of the mirror retention plate.

The latching mechanism 20 consists of a rotatable shaft 22 with its ends 23 held in the semicircular recesses 31.

The shaft 22 incorporates a pair of levers 24 that are engaged by the edge 61 of the mirror retention plate 60. Associated with each lever 24 is a headed spigot with a shaft 25 and a head 26. The bar 40 seats over the shaft 22 and the end shoulders 42 seat in the recesses 34 of buttresses 33 so that the locking tabs 44 extending from the end shoulders 42 pass through a slot 35 in the face of the buttress 33 that lies adjacent the edge 51 of retention plate 50. The locking tabs engage the edge 61 of the mirror retention plate. The bar 40 is biased by the springs 48 that are located in the recesses 34 of buttresses 33 and press against the shoulders 42. The bar 40 also includes channels 45 that are sized to accommodate the shafts 25 of the spigots 26. The shaft 22 is held in place by the springs 27 which bias the spigot heads 26 against the outside of the channels 45 as shown in parts 1, 2 and 3 of FIG. 2. When the retention plate is fully locked as in part 4 of FIG. 2 the spigot heads 26 lie on top of bar 40 and the spigot shafts 25 are held in the channels 45.

The release mechanism for the mirror plate consists of the sliding lever 51 and the rotatable lever 53. The slidable lever 51 extends from the slot 36 in the external wall of the mirror plate 12 through the retention slot 37 and between the pillars 38 that also retain the shaft 22. The rotatable lever 53 is attached to shaft 22 between the pillars 38. When the mirror plate is clipped to the retention plate the rotatable lever 53 rotates to the vertical position as shown in FIG. 4. At this point the end of the slidable lever abuts the rotatable lever so that pushing the slidable lever 51 inwards rotates the rotatable lever 53 and pushes back the bar 40 against the springs 48, so that the locking tabs 44 are withdrawn from engaging the edge 61 and allows the mirror plate 10 to disengage from the retention plate 60.

In the second embodiment shown in FIGS. 5 to 7 the mirror retention plate 60 and motor 61 are the same as in the first embodiment. The mirror support plate 70 is shown in FIGS. 5 and 6 and on its rear face has a compartment to receive the mirror retention plate 60. The ledges or hooks 75 on one parallel rib 74 are adapted to engage one free edge of the retention plate 60. The latching mechanism 80 is located on rib 76 spaced from rib 74 by a distance corresponding to the distance between the two edges of the mirror retention plate.

The latching mechanism 80 consists of a hook 85 having a hollow central boss 87 which is internally screw threaded and ledges 88 which are tapered and adapted to lie on the edge of the mirror retention plate 60. A worm 90 is attached at an approximate mid point of the rib 76 and is adapted to be rotatable within the boss 87 by rotation of the shaft 93. Shaft 93 has a snap connection 94 that locks into the slot 91 of worm 90. The other end 95 of shaft 93 fits into an opening in the edge of mirror plate 80 so that it can be easily accessed. The end 95 has a slot to enable it to be turned by a screw driver to move the tapered ledges 88 on to the edge of the mirror retention plate 60.

The shaft 93 can be of variable length to suit different sizes of mirror plate 70. The screw thread of the boss 87 is clipped to avoid over tightening of the shaft. As shown in FIG. 8 B. The worm 85 also includes an anti rotation device in its connection to the rib 76 as shown in FIG. 8C.

In FIG. 9 a gear wheel 99 is used instead of a screw driver to rotate shaft 93. The gear wheel can be accessed by a finger and engages the screw 97 on shaft 93.

A third embodiment is illustrated in FIG. 10 in which 10A illustrates the locking mechanism in its attach or release position and 10B in its locked position. Locking tabs 102 on the ends of shaft 101 are rotated out of contact with the edge of the mirror retention plate 60 by pressing the shaft 105 to compress the springs 107 to engage the rotation arm 103 which rotates the shaft 101.

A fourth embodiment is illustrated in FIG. 11 in which 11A illustrates the locking mechanism in its attach or release position and 11B in its locked position. Locking tabs 112 on the ends of pivoted shaft 111 are moved out of contact with the edge of the mirror retention plate 60 by pressing the shaft 115 to rotate the shaft 111 about the pivots 113 to compress the springs 117.

A fifth embodiment is illustrated in FIG. 12 in which 12A illustrates the locking mechanism in its attach or release position and 12 B in its locked position. Locking tabs 122 on the ends of shaft 121 are rotated out of contact with the edge of the mirror retention plate 60 by turning the shaft 121 with a screw driver in slot 123 to compress the spring 127.

In FIGS. 13 to 16 a sixth embodiment is shown in which a worm driven pair of flexible arms are advanced to a lock position. The arms are retained using a wedge channel to resist removal. The flexible arms deflect to pass into the wedge channel. FIGS. 17 to 23 illustrate the seventh embodiment in which the mirror plate is locked in place using a cam mechanism. The cam has a large surface to press to unlock the plate as shown in FIG. 20 and a small arm to be pushed in to lock the plate as shown in FIG. 19. The cam is illustrated in FIGS. 21 to 23 where the unlock tab 131 is limited in its deflection by rib 132. The hooked tab 133 deflects to pass the mounting plate for locking. At the other side a lip 134 shown in FIG. 22 provides downward pressure on the mirror plate in the locked position.

Figure 25:
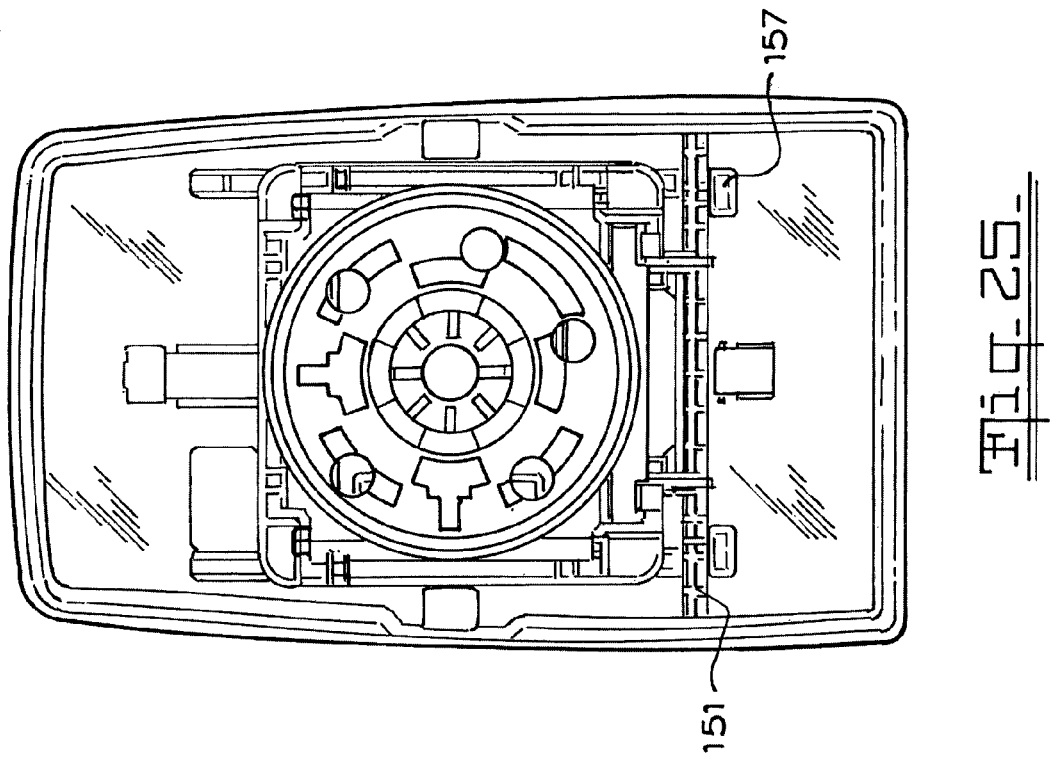
Figure 24:
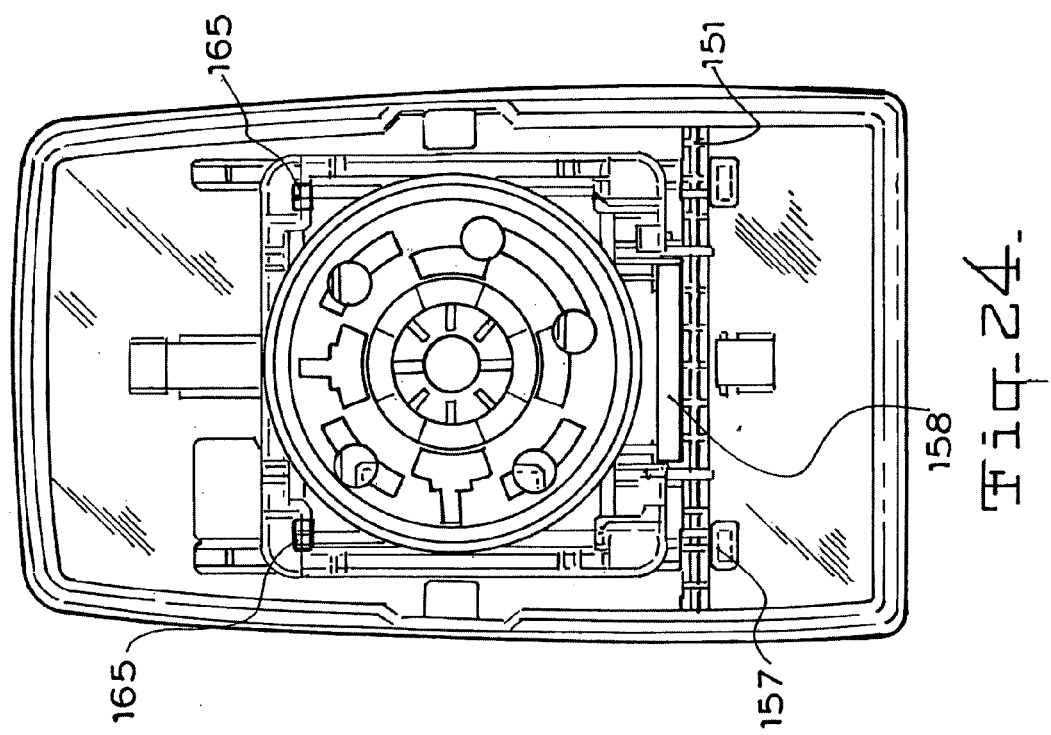

FIGS. 24 to 29 illustrate the eighth embodiment of the invention. FIGS. 24 26 and 29 show the locked position and FIGS. 25 and 27 show the unlocked position. The major components are shown in FIG. 28. The shaft 151 can be turned by a key or screwdriver in the end 152 from the side as shown in FIG. 29. The shaft 151 has arms 153 that click into slots 159 in the toggle wedge 158 rotation of the shaft 151 moves the toggle wedge against the mirror plate and locks the opposite edge under tabs 165 as shown in FIG. 24. The cams 154 have a flat face 154a shown in FIG. 27 that prevents the lock from self closing. The cam face is an interference fit against pillar 157. The smaller flat face 154 B shown in FIG. 26 ensures that a positive lock position is achieved when the shaft 151 is rotated to the lock position.

Those skilled in the art will realise that this invention has solved a long standing problem of easily replacing and securely retaining a mirror rear. Those skilled in the art will also realise that this invention can be implemented in embodiments other than those described without departing from the core teachings of this invention.

The invention claimed is:

1. A vehicle mirror assembly comprising:
    a mirror retention plate having two parallel free edges;
    a mirror;
    a mirror plate having a first surface to which the mirror is attached and a second surface, the second surface being opposite said first surface, the mirror plate having an engaged position and a disengaged position with respect to the mirror retention plate, the second surface having an attachment mechanism for releasably coupling the mirror plate to the mirror retention plate, the attachment mechanism comprising:
        projections extending from the second surface for engaging one of said free edges of the retention plate, wherein with the mirror plate in the engaged position, the one of said free edges of the mirror plate engages the projections;
        a locking mechanism for engaging the other of said free edges of the retention plate, the locking mechanism being alterable between an attach position and a locked position, wherein in the attach position the mirror plate is moveable between the unengaged position to the engaged position, and in the locked position the locking mechanism engages the other of said free edges of the retention plate and retains the mirror plate in the engaged position; and
        a release mechanism which actuates the locking mechanism from the locked position to the attach position.

2. A mirror plate for use in a vehicle mirror assembly including a mirror retention plate having two parallel free edges, said mirror plate having an engaged position and a disengaged position with respect to the mirror retention plate and comprising:
    a first surface to which a mirror is attached; and
    a second surface opposite said first surface and having an attachment mechanism for releasably coupling the mirror plate to the mirror retention plate, the attachment mechanism comprising:
        projections extending from the second surface for engaging one of said free edges of the retention plate, wherein with the mirror plate in the engaged position, the one of said free edges of the mirror plate engages the projections;
        a locking mechanism for engaging the other of said free edges of the retention plate, the locking mechanism being alterable between an attach position and a locked position, wherein in the attach position mirror plate is moveable between the unengaged position to the engaged position, and in the locked position the locking mechanism engages the other of said free edges of the retention plate and retains the mirror plate in the engaged position; and a release mechanism which actuates the locking mechanism from the locked position to the attach position.

3. The mirror plate as claimed in claim 2 in which the locking mechanism includes retention projections which engage the free edge of the retention plate when the locking mechanism is in the locked position and disengage the free edge of the retention plate when the locking mechanism is actuated from the locked position to the attach position.

4. The mirror plate as claimed in claim 1 in which the release mechanism includes actuation means accessible in the side or end wall of the mirror plate.

5. The mirror plate as claimed in claim 4 in which the release mechanism includes a shaft which is rotatable with a screw driver wherein the end of the shaft is accessible from the side or end wall of the mirror plate.

6. The mirror plate as claimed in claim 2 in which the release mechanism includes actuation means accessible in the side or end wall of the mirror plate.

7. The vehicle mirror assembly as claimed in claim 6 in which the release mechanism includes a shaft which is rotatable with a screw driver wherein the end of the shaft is accessible from the side or end wall of the mirror plate.

8. The vehicle mirror assembly as claimed in claim 1 in which the locking mechanism provides retention projections configured to be moved into and out of engagement with the free edge of the retention plate.

9. The vehicle mirror assembly as claimed in claim 1 wherein the release mechanism is further configured to actuate the locking mechanism from the attach position to the lock position.

10. The vehicle mirror assembly as claimed in claim 2 wherein the release mechanism is further configured to actuate the locking mechanism from the attach position to the lock position.

* * * * *